United States Patent
Morimoto et al.

(10) Patent No.: US 6,566,443 B2
(45) Date of Patent: May 20, 2003

(54) ROOM TEMPERATURE CURABLE SILICONE RUBBER COMPOSITION

(75) Inventors: Hirotoki Morimoto, Chiba Prefecture (JP); Kazutoshi Okabe, Chiba Prefecture (JP); Hiroshi Adachi, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 10/023,912

(22) Filed: Dec. 18, 2001

(65) Prior Publication Data

US 2002/0143100 A1 Oct. 3, 2002

(30) Foreign Application Priority Data

Jan. 30, 2001 (JP) ......................................... 2001-020855
Apr. 23, 2001 (JP) ......................................... 2001-124373

(51) Int. Cl.[7] ............................................. C08L 83/06
(52) U.S. Cl. .......................... 524/588; 528/901; 528/34; 528/35; 528/18; 528/28; 524/492; 525/477; 549/215
(58) Field of Search ............................ 528/901, 34, 35, 528/18; 524/588, 492, 477, 28; 549/215

(56) References Cited

U.S. PATENT DOCUMENTS 5,290,851 A * 3/1994 Ishida et al.

FOREIGN PATENT DOCUMENTS

| EP | 1 002 837 A1 | 5/2000 | ........... C08L/83/04 |
|----|--------------|--------|----------------------|
| JP | 39-27643 | 10/1961 | |
| JP | 55-43119 | 3/1980 | ........... C08L/83/04 |
| JP | 62-252456 | 11/1987 | ........... C08L/83/06 |

* cited by examiner

Primary Examiner—Robert Dawson
Assistant Examiner—Kuo-Liang Peng
(74) Attorney, Agent, or Firm—Jennifer S. Warren; Sharon K. Severance

(57) ABSTRACT

A nonsagging and extrudable room temperature curable silicone rubber composition with excellent adherence to a variety of substrates comprising
(A) diorganopolysiloxane having silicon-bonded alkoxy in molecular chain terminal position,
(B) surface-hydrophobicized dry method silica,
(C) non-surface-hydrophobicized dry method silica,
(D) alkoxysilane,
(E) an organotitanium compound, and
(F) light stabilizer and/or UV absorber.

11 Claims, No Drawings

ROOM TEMPERATURE CURABLE SILICONE RUBBER COMPOSITION

FIELD OF THE INVENTION

The present invention is a room temperature curable silicone rubber composition and more particularly a non-sagging and extrudable room temperature curable silicone rubber composition that exhibits an excellent and robust adherence to a variety of substrates when the composition is cured while in contact with the substrate.

BACKGROUND OF THE INVENTION

A large number of compositions are known within the art that cure at room temperature upon contact with atmospheric moisture to produce silicone rubber. Compositions of this type include alcohol-liberating room temperature curable silicone rubber compositions whose main components are alkoxysilyl-terminated diorganopolysiloxane and alkoxysilane. These alcohol-liberating room temperature curable silicone rubber compositions cure in the presence of an organotitanium compound catalyst with the liberation of alcohol. They are frequently used as sealants and adhesives for electrical/electronic instruments and devices and as sealants for building elements because they lack unpleasant odor and do not corrode metals (refer, for example, to Japanese Published (Kokoku or Examined) Patent Application Number Sho 39-27643 (27,643/1964) and Japanese Laid Open (Kokai or Unexamined) Patent Application Numbers Sho 55-43119 (43,119/1980) and Sho 62-252456 (252,456/1987)). Alcohol-liberating room temperature curable silicone rubber compositions of this type, however, are poorly adhesive to a variety of substrates, such as glass, plastics, and metals, and thus have been unable to provide fully satisfactory performance in some applications.

The inventors discovered that the above described problems can be solved by the admixture of two specific types of dry method silicas into an alcohol-liberating room temperature curable silicone rubber composition based on a special diorganopolysiloxane.

In more specific terms, the object of this invention is to provide a nonsagging and extrudable room temperature curable silicone rubber composition that exhibits an excellent and robust adherence to a variety of substrates when the composition is cured while in contact with the substrate.

SUMMARY OF THE INVENTION

The present invention is a room temperature curable silicone rubber composition comprising (A) 100 weight parts diorganopolysiloxane comprising
(a-1) 20 to 100 weight parts diorganopolysiloxane described by general formula

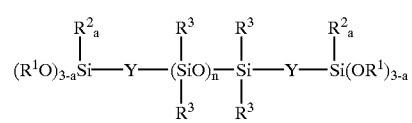

where $R^1$ and $R^2$ represent alkyl or alkoxyalkyl; $R^3$ is selected from the group consisting of monovalent hydrocarbyl, halogenated hydrocarbyl, and cyanoalkyl; a is 0 or 1; Y is selected from the group consisting of oxygen atom, divalent hydrocarbon group, and a group described by general formula

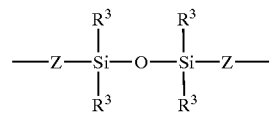

where $R^3$ is defined as above and Z represents a divalent hydrocarbon group; and n is a positive number that produces a viscosity at 25° C. of from 20 to 1,000,000 mPa·s and (a-2) 80 to 0 weight parts diorganopolysiloxane described by general formula

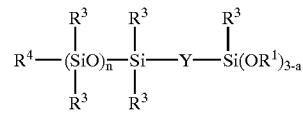

where $R^1$, $R^2$, and $R^3$ are defined as above, $R^4$ is alkyl or alkenyl, and Y, a, and n are defined as above;

(B) 1 to 20 weight parts surface-hydrophobicized dry method silica;

(C) 1 to 20 weight parts non-surface-hydrophobicized dry method silica;

(D) 1 to 25 weight parts alkoxysilane described by general formula $R^5{}_b Si(OR^6)_{4-b}$ where $R^5$ represents monovalent hydrocarbyl, $R^6$ is alkyl or alkoxyalkyl, and b is 0 or 1, or the partial hydrolysis and condensation product thereof, (E) 0.5 to 10 weight parts organotitanium compound; and (F) 0.01 to 5 weight parts light stabilizer and/or ultraviolet absorber.

DESCRIPTION OF THE INVENTION

The present invention is a room temperature curable silicone rubber composition comprising (A) 100 weight parts diorganopolysiloxane comprising
(a-1) 20 to 100 weight parts diorganopolysiloxane described by general formula

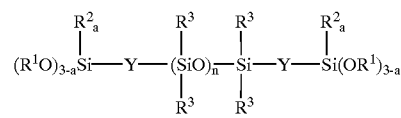

where $R^1$ and $R^2$ represent alkyl or alkoxyalkyl; $R^3$ is selected from the group consisting of monovalent hydrocarbyl, halogenated hydrocarbyl, and cyanoalkyl; a is 0 or 1; Y is selected from the group consisting of oxygen atom, divalent hydrocarbon group, and a group described by general formula

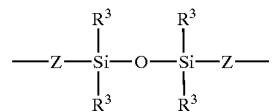

where $R^3$ is defined as above and Z represents a divalent hydrocarbon group; and n is a positive number that produces a viscosity at 25° C. of from 20 to 1,000,000 mPa·s and (a-2) 80 to 0 weight parts diorganopolysiloxane described by general formula

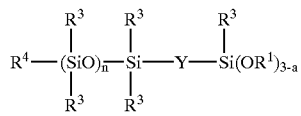

where $R^1$, $R^2$, and $R^3$ are defined as above, $R^4$ is alkyl or alkenyl, and Y, a, and n are defined as above;

(B) 1 to 20 weight parts surface-hydrophobicized dry method silica;

(C) 1 to 20 weight parts non-surface-hydrophobicized dry method silica;

(D) 1 to 25 weight parts alkoxysilane described by general formula $R^5{}_b Si(OR^6)_{4-b}$ where $R^5$ represents monovalent hydrocarbyl, $R^6$ is alkyl or alkoxyalkyl, and b is 0 or 1, or the partial hydrolysis and condensation product thereof;

(E) 0.5 to 10 weight parts organotitanium compound; and (F) 0.01 to 5 weight parts light stabilizer and/or ultraviolet absorber.

To explain the present invention in greater detail, the diorganopolysiloxane (A) is the base component of the composition. The component (a-1) encompassed by component (A) is diorganopolysiloxane having hydrolyzable alkoxy or alkoxyalkoxyl at both molecular chain terminals. $R^1$ and $R^2$ in the preceding formula for this diorganopolysiloxane each represent alkyl such as methyl, ethyl, propyl, or butyl, or alkoxyalkyl such as methoxyethyl, ethoxyethyl, methoxypropyl, or methoxybutyl. $R^3$ is selected from the group consisting of monovalent hydrocarbyl, halogenated hydrocarbyl, and cyanoalkyl groups. $R^3$ can be, for example, alkyl such as methyl, ethyl, propyl, or butyl; cycloalkyl such as cyclopentyl or cyclohexyl; alkenyl such as vinyl or allyl; aryl such as phenyl, tolyl, or naphthyl; aralkyl such as benzyl, phenylethyl, or phenylpropyl; halogenated hydrocarbyl such as chloromethyl, trifluoropropyl, or chloropropyl; or cyanoalkyl such as β-cyanoethyl or γ-cyanopropyl. Methyl is preferred among the preceding. Y and Z can each represent a divalent hydrocarbon group, for which alkylene is preferred, for example, methylene, propylene, and butylene. The subscript n represents a positive number that provides a viscosity at 25° C. of 20 to 1,000,000 mPa·s.

Component (a-2), which is diorganopolysiloxane having hydrolyzable alkoxy or alkoxyalkyl at only a single molecular chain terminal, functions to lower the modulus of the cured silicone rubber afforded by the present composition. $R^1$, $R^2$, $R^3$, a, n, Y and Z in the preceding formula for component (a-2) have the same definitions as for component (a-1). $R^4$ is alkyl such as methyl, ethyl, propyl, or butyl, or alkenyl such as vinyl or allyl. Component (A) comprises from 20 to 100 weight parts component (a-1) and from 80 to 0 weight parts (a-2) wherein the total of the two is 100 weight parts. Larger component (a-1) contents should be used when it is desired to raise the modulus of the cured product, while larger component (a-2) contents should be used when it is desired to lower the modulus. In addition, component (A) may consist of only 100 weight parts component (a-1).

Component (B) is surface-hydrophobicized dry method silica. This component functions to impart mechanical strength to the present composition and to impart adherence to a variety of substrates. This dry method silica can be obtained by hydrophobicizing the surface of the non-surface-hydrophobicized dry method silica described below for component (C) using any of various hydrophobicizing agents. The hydrophobicizing agent can be exemplified by hexamethyldisilazane, tetramethyldivinyldisilazane, dimethyldichlorosilane, trimethylchlorosilane, trimethylsilanol, methylhydrogenpolysiloxanes, octamethylcyclotetrasiloxane, and silanol-terminated dimethylsiloxane oligomers. These hydrophobicizing agents induce surface hydrophobicization by reacting with the silanol present on the surface of the dry method silica. Component (B) can be prepared, for example, by adding the hydrophobicizing agent to the dry method silica and then mixing with heating or by adding the hydrophobicization agent dropwise to the dry method silica while the silica is being stirred and heated. When this preparation is carried out with heating but without any mixing at all, the hydrophobicization treatment will be nonuniform due to the low vapor pressure of the hydrophobicizing agents. When, at the other extreme, this preparation is carried out with vigorous mixing, contact between the particles of the dry method silica will cause a loss of structural characteristics and an increase in bulk density, resulting in a decline in the fluidity of the dry method silica. Mild mixing conditions are therefore preferred, with a preferred heating temperature range of 100 to 200° C. Component (B) is a finely divided powder and preferably has a BET specific surface area of at least 100 $m^2/g$.

The carbon atom content of component (B) is preferably 0.1 to 5 weight % and more preferably 0.1 to 1.6 weight %. This carbon atom content can be measured, for example, by the procedure described in Japanese Laid Open (Kokai or Unexamined) Patent Application Number Hei 9-71411 (71, 411/1997). In this procedure, the dry method silica is heated to 1,000° C. in order to thermally degrade the carbon-containing surface-modifying groups present on the surface with conversion into carbon dioxide. The amount of carbon dioxide is then measured by analysis with a trace carbon analyzer. Component (B) also preferably has an ignition loss (weight loss upon heating for 2 hours at 1,000° C.) of 0.1 to 7 weight %.

Component (C) is non-surface-hydrophobicized dry method silica. This component functions through its combined use with component (B) to impart nonsag behavior to the present composition and to improve the mechanical strength of the cured product afforded by the present composition. This dry method silica can be exemplified by fumed silica, which is produced by the hydrolysis of silicon tetrachloride in an oxyhydrogen flame, and by arc silica, which is produced by heating a silica sand/coke mixture to high temperature with an arc. Examples of the dry method silica under consideration are available commercially under the following product names: Aerosil 130, 200, 300, and 380 from Nippon Aerosil Co., Ltd. (Japan), and Cab-O-Sil M-5, MS-7, MS-75, HS-7, ET-7, HS-5, and ET-5 from the Cabot Corporation (USA). Component (C) is used at from 1 to 20 weight parts per 100 weight parts component (A). The nonsag performance declines at less than 1 weight part, while the extrudability of the present composition declines at more than 20 weight parts. The component (B): component (C) weight ratio is preferably 1:0.1 to 1:10. The total of components (B) and (C) is preferably from 2 to 20 weight parts per 100 weight parts component (A).

Component (D) is a crosslinker and comprises alkoxysilane with the general formula $R^5{}_b Si(OR^6)_{4-b}$ or its partial hydrolysis and condensation product. $R^5$ in the formula is monovalent hydrocarbyl (e.g., alkyl such as methyl, ethyl, propyl, or butyl, or alkenyl such as vinyl or allyl), $R^6$ is alkyl (e.g., methyl, ethyl, propyl, butyl) or alkoxyalkyl (e.g., methoxyethyl, ethoxyethyl, methoxypropy, methoxybutyl), and b is 0 or 1. Component (D) can be exemplified by trifunctional alkoxysilanes such as methyltrimethoxysilane, methyltriethoxysilane, ethyltrimethoxysilane, vinyltrimethoxysilane, phenyltrimethoxysilane, and methyltrimethoxyethoxysilane; tetrafunctional alkoxysilanes such as tetramethoxysilane and tetraethoxysilane; and the partial hydrolysis and condensation products of these silanes. Component (D) can take the form of a single compound or a mixture of two or more compounds.

The use of too little component (D) results in such problems as an inadequate cure of the composition and a strong tendency for thickening and gelation to occur during storage. The use of too much component (D) causes such problems as slow curing and unfavorable economics. For these reasons component (D) should be used at from 1 to 25 weight parts and is preferably used at from 2 to 10 weight parts per 100 weight parts component (A).

The organotitanium compound (E) is a curing catalyst for the present composition and is exemplified by titanate esters such as tetra(isopropoxy)titanium, tetra(n-butoxy)titanium, and tetra(tert-butoxy)titanium and by titanium chelates such as di(isopropoxy)bis(ethyl acetoacetate)titanium, di(isopropoxy)bis(methyl acetoacetate)titanium, and di(isopropoxy)bis(acetylacetone)titanium. The addition of too little component (E) results in a slow cure of the composition, while the addition of too much results in such problems as poor storage stability and unfavorable economics. For these reasons, component (E) should be used at from 0.5 to 10 weight parts and is preferably used at from 1 to 5 weight parts per 100 weight parts component (A).

The light stabilizer and ultraviolet (UV) absorber encompassed by component (F) function to impart a durable adherence to the present composition. The light stabilizers and UV absorbers heretofore known for use in organic resins or organic rubbers for the purpose of imparting weathering resistance thereto can be used as component (F). The light stabilizer preferably takes the form of a hindered amine compound. This hindered amine compound is exemplified by compounds with the following chemical structural formulas.

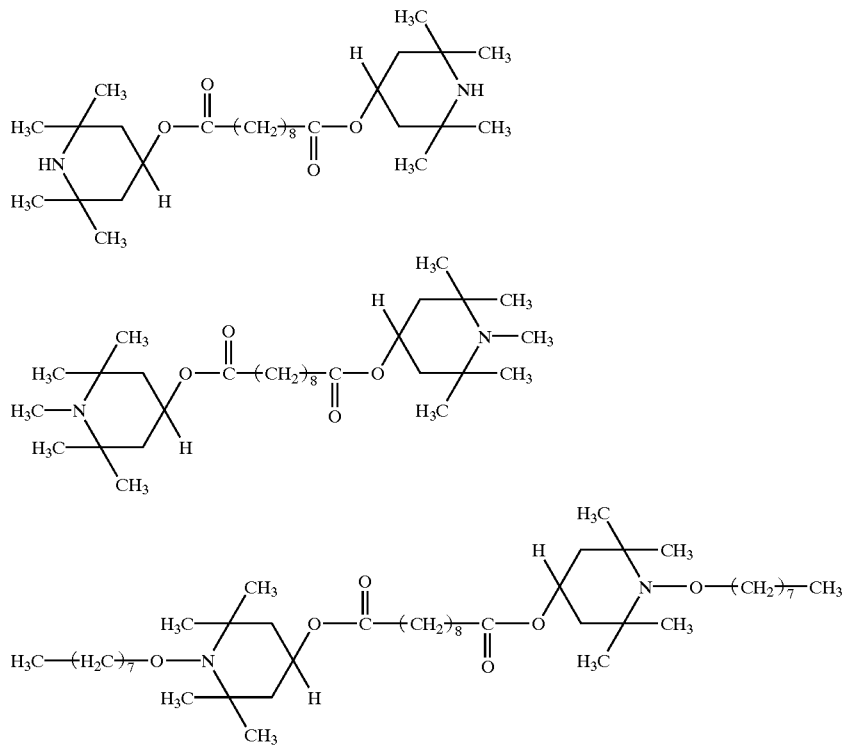

Other examples are Adekastab LA-52, Adekastab LA-57, Adekastab LA-62, Adekastab LA-67, Adekastab LA-77, Adekastab LA-63P, and Adekastab LA-68LD, all from Asahi Denka Kogyo Kabushiki Kaisha, and CHIMASSORB 944 and CHIMASSORB 119 from Ciba Specialty Chemicals.

The UV absorber can be exemplified by benzotriazole-type compounds, benzophenone-type compounds, aryl ester compounds, cyanoacrylate compounds, and triazine-type compounds, among which cyanoacrylate compounds and triazine-type compounds are preferred. The cyanoacrylate compound UV absorbers can be exemplified by compounds with the following chemical structural formulas.

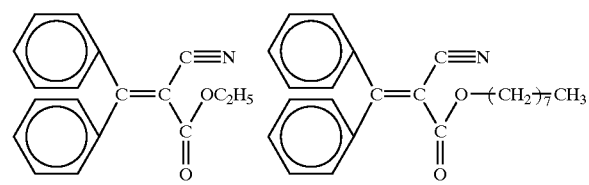

The triazine-type compound UV absorbers can be exemplified by compounds with the following chemical structural formulas.

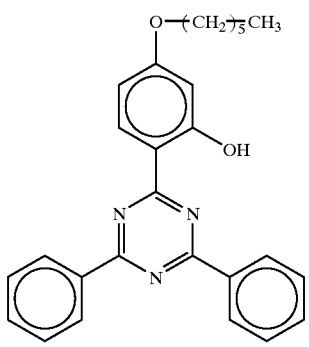

Component (F) is added in the range of 0.01 to 5 weight parts and preferably in the range of 0.1 to 2 weight parts, in each case per 100 weight parts component (A). The durability of the adherence declines when the addition of component (F) falls below the given range, while the adherence and mechanical strength decline when the addition of component (F) exceeds the given range. A light stabilizer+UV absorber combination is preferably used for component (F), in which case the light stabilizer:UV absorber ratio is preferably in the range of 1:0.1 to 1:2 expressed as the weight ratio.

The present composition comprises the components (A) through (F) described above, but may also contain, for the purpose of inducing additional improvements in the adherence of the composition, from 0.01 to 5 weight parts (G) epoxy-functional organoalkoxysilane, aminoalkyl-functional organoalkoxysilane, or their reaction mixture. The composition may also contain from 0.01 to 5 weight parts polyoxyalkylene-modified organopolysiloxane as a sag inhibitor and, for the purpose of producing a low modulus cured product, may contain difunctional alkoxysilane (e.g., dimethyldimethoxysilane, diphenyldimethoxysilane) or trimethylsiloxy-endblocked dimethylpolysiloxane.

The present composition may also contain, insofar as the object of this invention is not impaired, the various additives known for use in silicone rubber compositions. These additives are exemplified by inorganic fillers other than dry method silica, organic solvents, antimolds, flame retardants, heat stabilizers, plasticizers, thixotropy agents, and pigments. The inorganic filler can be exemplified by wet method silica, finely divided quartz, calcium carbonate, fumed titanium dioxide, diatomaceous earth, aluminum hydroxide powder, alumina powder, magnesium oxide powder, zinc oxide powder, and zinc carbonate powder and by these same fillers after surface hydrophobicization by surface treatment with, for example, an organosilane, silazane, or siloxane oligomer.

The present composition can be prepared simply by mixing components (A) through (F) and any optional additives to homogeneity while excluding moisture. The resulting composition can then be stored sealed in an airtight container and exposed to the air when its use is required, whereupon it will cure under the influence of atmospheric moisture to give a silicone rubber.

The present composition has excellent nonsag behavior and extrudability and exhibits excellent adherence to a variety of substrates when the composition is cured while in contact with the substrate. This composition is therefore useful in those applications where such properties are required, for example, as an architectural or building sealant or an industrial sealant or adhesive.

EXAMPLES

The invention will be explained in greater detail below through working examples. The viscosity values reported in the examples were measured at 25° C. The following abbreviations are used in the examples: Me for the methyl group, Et for the ethyl group. The following procedures were used to measure the sag behavior, extrudability, initial adherence, and adherence durability of the room temperature curable silicone rubber compositions.

Sag Behavior

The room temperature curable silicone rubber composition was filled into a 2.5-mL syringe. The tip (diameter=1 mm) of the syringe was then cut off and the room temperature curable silicone rubber composition was extruded at an extrusion rate of 1 mm/10 seconds. The distance of advance until the composition sagged down was measured.

Extrudability

The room temperature curable silicone rubber composition was filled into a 2.5-ml syringe. The tip (diameter=1 mm) of the syringe was then cut off and the time (seconds) required to extrude 2 mL of the composition from the tip at a pressure of 1.5 kgf/cm$^2$ was measured.

Initial Adherence

The room temperature curable silicone rubber composition was extruded in bead form from a cartridge onto the surface of each of the following substrates: glass sheet, metal sheet (aluminum, stainless steel, and copper), and plastic sheet (vinyl chloride, polycarbonate, and polymethyl methacrylate). Curing was then carried out by standing for 3 days in a curing chamber held at a temperature of 25° C. and a humidity of 50%. The adherence was subsequently measured by manually pulling an end of the cured silicone rubber bead so as to peel the silicone rubber bead from the substrate. The measurement results were evaluated on the following scale.

+: rupture in the silicone rubber layer (100% cohesive failure)

Δ: peeling occurred in part at the interface between the silicone rubber layer and the substrate (50 to 99% cohesive failure)

×: peeling occurred mainly at the interface between the silicone rubber layer and the substrate (0 to 49% cohesive failure)

Adherence Durability

Adhesive specimens were prepared by extruding the room temperature curable silicone rubber composition in bead form from a cartridge onto the surface of glass sheet and metal sheet (aluminum, stainless steel, copper). Curing was then effected by holding the adhesive specimen for 3 days in a curing chamber at a temperature of 25° C. and a humidity of 50%. After curing the adhesive specimen was held for 3 days in water at room temperature (50° C.). Upon removal of the adhesive specimen, the adherence was measured by manually pulling an end of the cured silicone rubber bead so as to peel the silicone rubber bead from the substrate. The measurement results were evaluated on the following scale.

+: rupture in the silicone rubber layer (100% cohesive failure)

Δ: peeling occurred in part at the interface between the silicone rubber layer and the substrate (50 to 99% cohesive failure)

×: peeling occurred mainly at the interface between the silicone rubber layer and the substrate (0 to 49% cohesive failure)

Example 1

A silicone rubber base compound was prepared by mixing the following: 40 weight parts α,ω-triethoxysilylethylene dimethylpolysiloxane having a viscosity of 15,000 mPa·s and formula (1) given below (n in formula (1) is a positive number that gives a viscosity of 15,000 mPa·s), 60 weight parts α-methyl-ω-triethoxysilylethylene dimethylpolysiloxane having a viscosity of 15,000 mPa·s and formula (2) given below (n in formula (2) is a positive number that gives a viscosity of 15,000 mPa·s), 5 weight parts surface-hydrophobicized (treatment with dimethyldichlorosilane) dry method silica with a BET specific surface area of 110 m$^2$/g (carbon atom content=1.1 weight %, ignition loss=2 weight %), and 5 weight parts non-surface-hydrophobicized dry method silica with a BET specific surface area of 200 m$^2$/g. The following were mixed to homogeneity into this silicone rubber base compound while excluding moisture in order to prepare a room temperature curable silicone rubber composition: 2.55 weight parts methyltrimethoxysilane, 2.55 weight parts isobutyltrimethoxysilane, 3 weight parts tetra(tert-butoxy)titanium, 0.5 weight part of the reaction mixture of γ-aminopropyltrimethoxysilane and γ-glycidoxypropyltrimethoxysilane (this reaction mixture was prepared by mixing γ-aminopropyltrimethoxysilane and γ-glycidoxypropyltrimethoxysilane in a molar ratio of 1:2 and holding the mixture for 4 weeks at 25° C. and a humidity of 50%), 1 weight part polyoxyalkylene-modified methylpolysiloxane (SF8428 from Toray Dow Corning Company, Limited), and 0.3 weight part hindered amine light stabilizer (Adekastab LA-67 from Asahi Denka Kogyo Kabushiki Kaisha, the condensate of 2,2,6,6-tetramethyl-4-piperidinol, tridecyl alcohol, and 1,2,3,4-butanetetracarboxylic acid). The sag behavior, extrudability, initial adherence, and adherence durability of the room temperature curable silicone rubber composition were measured, and the results are reported below in Tables 1 and 2.

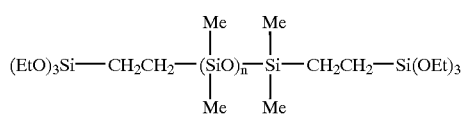

(1)

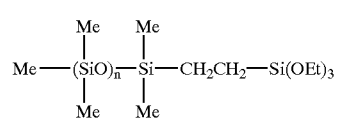

(2)

Example 2

A room temperature curable silicone rubber composition was prepared as described in Example 1, but in this case using 7.5 weight parts of the surface-hydrophobicized (treatment with dimethyldichlorosilane) dry method silica with a BET specific surface area of 110 m$^2$/g and 2.5 weight parts of the non-surface-hydrophobicized dry method silica (BET specific surface area=200 m$^2$/g) that were used in Example 1. The sag behavior, extrudability, initial adherence, and adherence durability of the room temperature curable silicone rubber composition were measured, and the results are reported below in Tables 1 and 2.

Example 3

A room temperature curable silicone rubber composition was prepared as described in Example 1, but in this case using 2.5 weight parts of the surface-hydrophobicized (treatment with dimethyldichlorosilane) dry method silica with a BET specific surface area of 110 m$^2$/g and 7.5 weight parts of the non-surface-hydrophobicized dry method silica (BET specific surface area=200 m$^2$/g) that were used in Example 1. The sag behavior, extrudability, initial adherence, and adherence durability of the room temperature curable silicone rubber composition were measured, and the results are reported below in Tables 1 and 2.

Comparative Example 1

A room temperature curable silicone rubber composition was prepared as described in Example 1, but in this case replacing the 5 weight parts surface-hydrophobicized (treatment with dimethyldichlorosilane) dry method silica with a BET specific surface area of 110 m$^2$/g used in Example 1 with 5 weight parts of the non-surface-hydrophobicized dry method silica (BET specific surface area=200 m$^2$/g) used in Example 1. This brought the addition of the non-surface-hydrophobicized dry method silica (BET specific surface area=200 m$^2$/g) to 10 weight parts. The sag behavior, extrudability, initial adherence, and adherence durability of the room temperature curable silicone rubber composition were measured, and the results are reported below in Tables 1 and 2.

Comparative Example 2

A room temperature curable silicone rubber composition was prepared as described in Example 1, but in this case replacing the 5 weight parts non-surface-hydrophobicized dry method silica (BET specific surface area=200 m$^2$/g) used in Example 1 with 5 weight parts of the surface-hydrophobicized (treatment with dimethyldichlorosilane) dry method silica with a BET specific surface area of 110 m$^2$/g that was used in Example 1. This brought the addition of the surface-hydrophobicized (treatment with dimethyldichlorosilane) dry method silica with a BET specific surface area of 110 m$^2$/g to 10 weight parts. The sag behavior, extrudability, initial adherence, and adherence durability of the room temperature curable silicone rubber composition were measured, and the results are reported below in Tables 1 and 2.

TABLE 1

|  | examples | | | comparative examples | |
|---|---|---|---|---|---|
|  | 1 | 2 | 3 | 1 | 2 |
| rheological properties | | | | | |
| sag behavior (mm) | 25 | 20 | 30 | 35 | 18 |
| extrudability (sec/2 mL) | 25 | 22 | 30 | 35 | 20 |
| initial adherence | | | | | |
| glass sheet | + | + | + | Δ | + |
| aluminum sheet | + | + | + | Δ | + |
| stainless steel sheet | + | + | + | Δ | Δ |
| copper sheet | + | + | + | Δ | + |
| vinyl chloride sheet | + | + | + | + | + |
| polycarbonate sheet | + | + | + | + | + |
| polymethyl methacrylate sheet | + | + | + | + | + |

TABLE 2

| | examples | | | comparative examples | |
|---|---|---|---|---|---|
| | 1 | 2 | 3 | 1 | 2 |
| adherence durability | | | | | |
| glass sheet | + | + | + | Δ | + |
| aluminum sheet | + | + | + | Δ | Δ |
| stainless steel sheet | + | + | Δ | Δ | Δ |
| copper sheet | + | + | Δ | Δ | Δ |

We claim:

1. A room temperature curable silicone rubber composition comprising
   (A) 100 weight parts diorganopolysiloxane comprising
      (a-1) 20 to 100 weight parts diorganopolysiloxane described by general formula

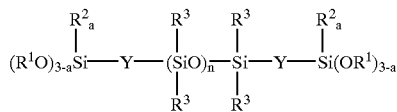

where $R^1$ and $R^2$ represent alkyl or alkoxyalkyl; $R^3$ is selected from the group consisting of monovalent hydrocarbyl, halogenated hydrocarbyl, and cyanoalkyl; a is 0 or 1; Y is selected from the group consisting of oxygen atom, divalent hydrocarbon group, and a group described by general formula

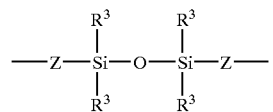

where $R^3$ is defined as above and Z represents a divalent hydrocarbon group; and n is a positive number that produces a viscosity at 25° C. of from 20 to 1,000,000 mPa·s and
      (a-2) 80 to 0 weight parts diorganopolysiloxane described by general formula

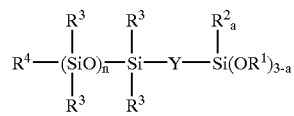

where $R^1$, $R^2$, and $R^3$ are defined as above, $R^4$ is alkyl or alkenyl, and Y, a, and n are defined as above;
   (B) 1 to 20 weight parts surface-hydrophobicized dry method silica;
   (C) 1 to 20 weight parts non-surface-hydrophobicized dry method silica;
   (D) 1 to 25 weight parts alkoxysilane described by general formula $R^5_b Si(OR^6)_{4-b}$ where $R^5$ represents monovalent hydrocarbyl, $R^6$ is alkyl or alkoxyalkyl, and b is 0 or 1, or the partial hydrolysis and condensation product thereof;
   (E) 0.5 to 10 weight parts organotitanium compound; and
   (F) 0.01 to 5 weight parts light stabilizer and/or ultraviolet absorber.

2. The room temperature curable silicone rubber composition of claim 1 in which the Y in components (a-1) and (a-2) is alkylene.

3. The room temperature curable silicone rubber composition of claim 1 in which component (B) has a carbon atom content of from 0.1 to 5 weight %.

4. The room temperature curable silicone rubber composition of claim 1 where component (B) has an ignition weight loss after heating for 2 hours at 1,000° C. of 0.1 to 7 weight %.

5. The room temperature curable silicone rubber composition of claim 1 where the weight ratio of component (B):component (C) is from 1:0.1 to 1:10.

6. The room temperature curable silicone rubber composition of claim 1 where the light stabilizer of component (F) is a hindered amine compound.

7. The room temperature curable silicone rubber composition of claim 1 further comprising
   (G) 0.01 to 5 weight parts of a compound selected from the group consisting of epoxy-functional organoalkoxysilane, aminoalkyl-functional organoalkoxysilane, and their reaction mixture.

8. An architectural or building sealant comprising the room temperature curable silicone rubber composition of claim 1.

9. The room temperature curable silicone rubber composition of claim 1 where component (B) has a BET specific surface area of at least 100 m/g.

10. The room temperature curable silicone rubber composition of claim 1 where component (B) has a carbon atom of 0.1 to 1.6 weight percent.

11. The room temperature curable silicone rubber composition of claim 1 where component (F) comprises a light stabilizer and a UV absorber in a weight ratio in the range of 1:0.1 to 1:2.

* * * * *